(12) United States Patent
Ahn

(10) Patent No.: US 7,843,622 B2
(45) Date of Patent: Nov. 30, 2010

(54) ACTIVE OPTICAL FILTER CONTROLLED BY MAGNETIC FIELD

(75) Inventor: Pil-soo Ahn, Suwon-si (KR)

(73) Assignees: Samsung Electronics Co., Ltd., Suwon-si, Gyeonggi-do (KR); Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 151 days.

(21) Appl. No.: 12/318,500

(22) Filed: Dec. 30, 2008

(65) Prior Publication Data
US 2009/0279161 A1 Nov. 12, 2009

(30) Foreign Application Priority Data
May 7, 2008 (KR) ...................... 10-2008-0042458

(51) Int. Cl.
*G02F 1/09* (2006.01)
*G02F 1/295* (2006.01)

(52) U.S. Cl. .................. 359/280; 359/282; 359/283; 359/287; 359/298; 385/6

(58) Field of Classification Search .............. 359/280, 359/282, 287, 298, 484, 487; 385/6, 11, 385/14, 16, 31; 977/834, 838, 932; 324/318–320; 204/192.1, 298.16; 164/335, 467, 478, 502; 174/350, 377
See application file for complete search history.

(56) References Cited

U.S. PATENT DOCUMENTS

| | | | | |
|---|---|---|---|---|
| 3,666,351 A | * | 5/1972 | Pao | 359/298 |
| 4,968,136 A | * | 11/1990 | Lim et al. | 356/469 |
| 5,076,675 A | * | 12/1991 | Kusaka et al. | 359/484 |
| 5,351,319 A | * | 9/1994 | Ginder et al. | 385/6 |
| 6,520,246 B2 | * | 2/2003 | Poloni et al. | 164/467 |
| 6,796,362 B2 | * | 9/2004 | Lombard et al. | 164/335 |
| 7,550,679 B1 | * | 6/2009 | Wershoven | 174/377 |

* cited by examiner

*Primary Examiner*—Loha Ben
(74) *Attorney, Agent, or Firm*—Robert E. Bushnell, Esq.

(57) ABSTRACT

An active optical filter transmits or blocks light according to whether or not a magnetic field is applied, and functions as an optical filter transmitting light having a predetermined wavelength when light is transmitted according to a magnetic field. The active optical filter includes: an optical filter layer for transmitting or blocking light according to whether or not a magnetic field is applied; and a magnetic field applying unit surrounding the optical filter layer for applying a magnetic field to the optical filter layer. The optical filter layer has a multi-layer thin layer structure which is formed of two kinds of thin layers having different respective refractive indices and sequentially and periodically stacked on a substrate.

21 Claims, 7 Drawing Sheets

INCIDENT ANGLE : 20°

INCIDENT ANGLE : 40°

ACTIVE OPTICAL FILTER CONTROLLED BY MAGNETIC FIELD

CLAIM OF PRIORITY

This application makes reference to, incorporates the same herein, and claims all benefits accruing under 35 U.S.C. §119 from an application for Active Optical Filter Controlled by Magnetic Field earlier filed in the Korean Intellectual Property Office on the 7$^{th}$ May 2008 and there duly assigned Serial No. 10-20080042458.

BACKGROUND OF THE INVENTION

1. Field of the Invention

The present invention relates to an active optical filter and, more particularly, to an active optical filter transmitting or blocking light according to whether a magnetic field is applied or not, and functioning as an optical filter transmitting light having a predetermined wavelength in accordance with an applied magnetic field.

2. Description of the Related Art

In general, in a color display device, a pixel is formed of three sub-pixels, each capable of expressing red, green or blue colors. Each sub-pixel includes a color filter transmitting only light of a corresponding color. Currently used color filters are passive filters transmitting only light having a predetermined wavelength, and do not function as an optical shutter which controls transmission or blocking of light. For example, an optical shutter of a liquid crystal display includes two polarization plates and a liquid crystal layer disposed between the polarization plates. In this case, light can be transmitted or blocked by controlling the crystal alignment of the liquid crystal layer using an electric field.

However, since an optical shutter having a complicated structure must be used in conjunction with a color filter, light loss in conventional color display devices is very large. For example, due to the light loss of the optical shutter and color filter, only 7-13% of light generated in a backlight unit can be delivered to the viewer.

SUMMARY OF THE INVENTION

The present invention provides an active optical filter which can function both as an optical shutter and a color filter, and which is capable of transmitting light having a predetermined wavelength or blocking all light incident thereon by controlling a magnetic field.

According to an aspect of the present invention, there is provided an active optical filter comprising: an optical filter layer for transmitting or blocking light according to whether or not a magnetic field is applied; and a magnetic field applying unit surrounding the optical filter layer and applying a magnetic field to the optical filter layer; wherein the optical filter layer has a multi-layer thin layer structure which is formed of two kinds of thin layers having different refractive indices, and wherein the thin layers are sequentially and periodically stacked on a substrate.

The magnetic applying unit may be a coil or a conductor film surrounding the lateral circumference of the optical filter layer.

The direction of a magnetic field applied to the optical filter layer by the magnetic field applying unit may be parallel to the proceeding direction of light incident on the optical filter layer.

The two kinds of thin layers may have different complex refractive indices relative to each other, and an attenuation coefficient k of an imaginary number part of the complex refractive index of the thin layers may become 0 when a magnetic field is applied.

The thin layers may be formed of ferromagnetic nano-crystals.

One ferromagnetic nano-crystal may form a single magnetic domain.

The substrate may be a transparent substrate.

According to another embodiment of the present invention, the substrate may be formed of ferromagnetic nano-crystals.

The magnetic applying unit may be formed so as to surround at least one of a light incident surface and a light exit surface of the optical filter layer.

The direction of a magnetic field applied to the optical filter layer by the magnetic field applying unit may be perpendicular to the proceeding direction of light incident on the optical filter layer.

The optical thickness of each of the thin layers may be ¼ of a central wavelength of a wavelength band of light to be transmitted.

The active optical filter may further comprise a magnetic circuit unit surrounding the lateral circumference of the magnetic applying unit and formed of a ferromagnetic body.

According to another aspect of the present invention, there is provided a display device comprising: a backlight unit; a transparent substrate facing the backlight unit; and a plurality of sub-pixels formed on a surface of the transparent substrate; wherein each of the sub-pixels comprises an optical filter layer having the above-described structure.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

The present invention will now be described more fully with reference to the accompanying drawings, in which exemplary embodiments of the invention are shown.

First, the magnetic characteristics of a material for explaining the operational principles of an active optical filter will be described.

Figure 1:
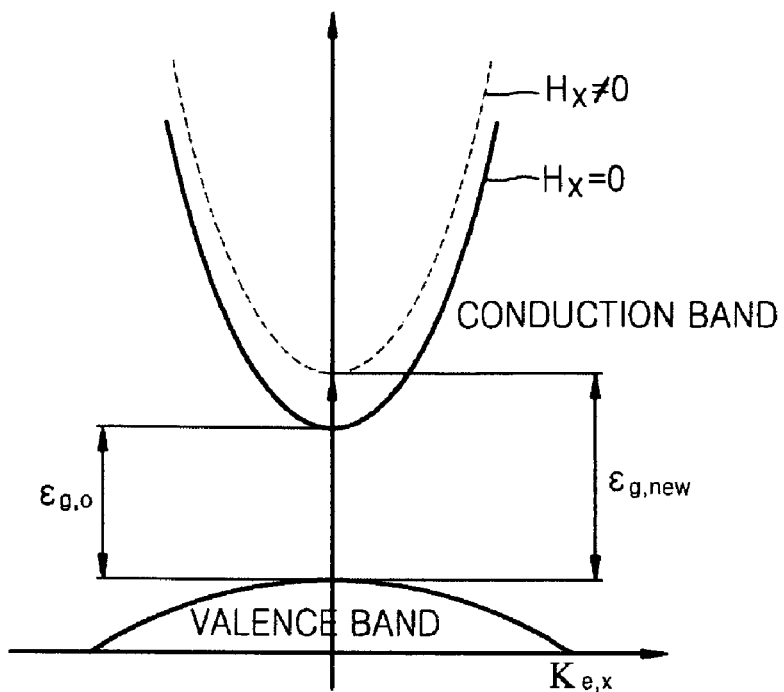
FIGS. 1, 2A and 2B are schematic views illustrating the band gap variation of a material when a magnetic field is applied thereto.
Figure 2A:
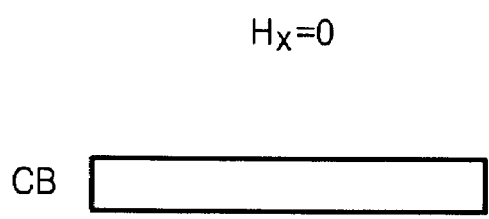
Figure 2B:
Figure 2B:
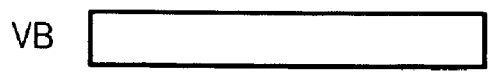

FIGS. 1, 2A and 2B illustrate the band gap variation of the material in a direction of a magnetic field applied thereto. As illustrated in FIG. 1, when a magnetic field is applied to the material, the height of a conduction band of the material increases in the direction of the applied magnetic field. As a result, a band gap between the conduction band and a valence band is increased. That is, when comparing the band gap of FIG. 2A in the case where a magnetic field is not applied and the band gap of FIG. 2B in the case where a magnetic field is applied, it is seen that the band gap increases in proportion to the intensity of the applied magnetic field.

In general, when light having larger energy than a band gap is incident on a material, electrons of a valence band are excited to move to a conduction band. During this process, light loses energy in proportion to the band gap energy, and thus light does not pass through the material and, accordingly, light is lost. On the other hand, when light having smaller energy than a band gap is incident on the material, light passes through the material without light loss. When the band gap of the material is increased due to the applied magnetic field, the energy required to excite the electrons of the valence band to the conduction band is increased. Accordingly, light which is incident in the direction of the applied magnetic field, and which has greater energy than that when a magnetic field is not applied, can pass through the material. In other words, the cut-off frequency $\omega_c$ is increased by as much as the intensity of the applied magnetic field.

Figure 3:
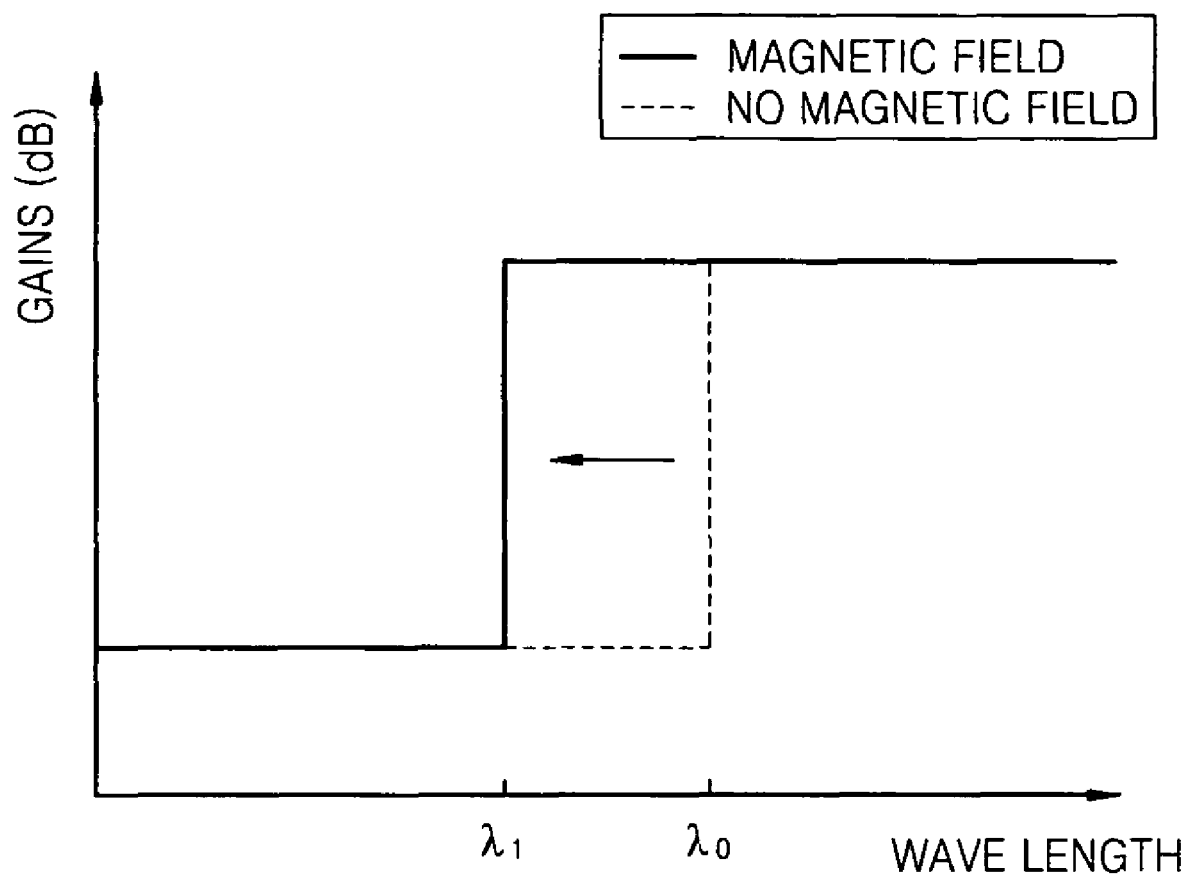
FIG. 3 is a graph showing transmittivity of light according to wavelength of light passing through the material according to the band gap variation.

For example, as illustrated in the graph of FIG. 3, compared to the case where a magnetic field is not applied (the dotted line), light having a shorter wavelength which is incident in the direction of the applied magnetic field can pass through the material when a magnetic field is applied (the solid line). That is, when a magnetic field is not applied, light having a wavelength $\lambda_0$ or shorter is blocked, but when a magnetic field is applied, light having a wavelength $\lambda_1$, which is shorter than $\lambda_0$, or smaller is blocked. Accordingly, the function of an optical shutter can be obtained between the wavelength $\lambda_0$ and the wavelength $\lambda_1$.

The above-described characteristics of the material can also be described using the variation of the complex refractive index. The complex refractive index of the material can be expressed as in Equation 1 below.

$$N=n+jk \qquad \text{Equation 1}$$

In Equation 1, N is a complex refractive index of a material, an actual number part n of the complex refractive index is the actual refractive index, and an imaginary number part k of the complex refractive index is an attenuation coefficient denoting the absorption of light. When the attenuation coefficient k is large, light cannot pass through the material due to the absorption of light. However, when a magnetic field is applied to the material, the attenuation coefficient k is decreased, and when the intensity of the magnetic field is increased so as to be sufficiently large, the attenuation coefficient k becomes 0, and light can pass through the material thereby.

Hereinafter, the configuration and the operation of an active optical filter according to an embodiment of the present invention having the magnetic characteristics of the above-described material will be described in detail with reference to attached drawings.

Figure 4A:
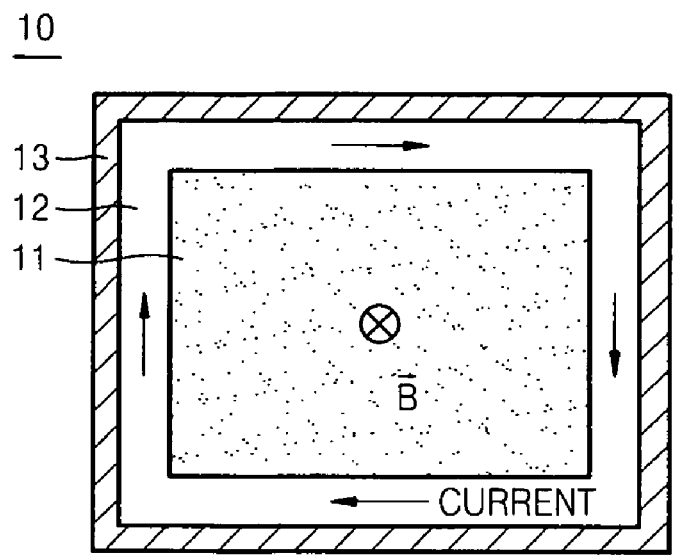
FIG. 4A is a plan view of an active optical filter according to an embodiment of the present invention.
Figure 4B:
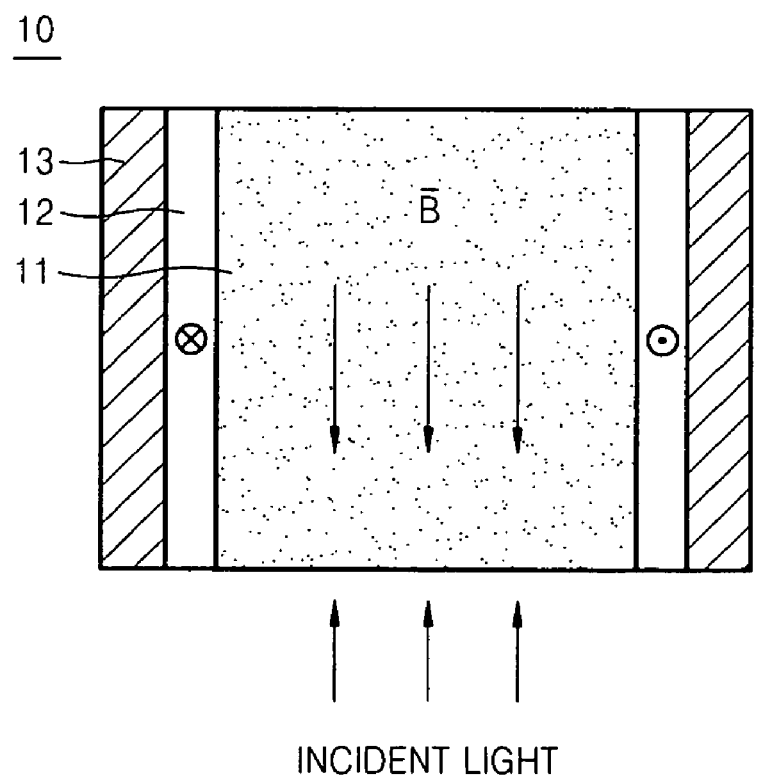
FIG. 4B is a cross-sectional view of an active optical filter according to an embodiment of the present invention.

FIGS. 4A and 4B are a plan view and a cross-sectional view, respectively, of an active optical filter according to an embodiment of the present invention. Referring to FIGS. 4A and 4B, the active optical filter 10 may include an optical filter layer 11 transmitting or blocking light according to whether or not a magnetic field is applied, a magnetic field applying unit 12 surrounding the lateral circumference of the optical filter layer 11 and applying a magnetic field to the optical filter layer 11, and a magnetic circuit unit 13 surrounding the lateral circumference of the magnetic field applying unit 12.

The magnetic applying unit 12 generates a magnetic field flowing upward or downward through the optical filter layer 11 by supplying a current to flow around the lateral circumference of the optical filter layer 11. To this end, the magnetic field applying unit 12 may be a coil surrounding the circumference of the optical filter layer 11 or a conductor film in various forms. In FIG. 4B, the direction of the magnetic field formed inside the optical filter layer 11 is illustrated as being opposite to the incident direction of incident light. However, the direction of the magnetic field formed inside the optical filter layer 11 may also be in the same direction of the incident direction of incident light. That is, the direction of incident light incident to the optical filter layer 11 and the direction of the magnetic field formed inside the optical filter layer 11 may be parallel to each other.

Meanwhile, the magnetic field generated inside the optical filter layer 11 by the magnetic field applying unit 12 flows into the magnetic circuit unit 13 surrounding the magnetic field applying unit 12. To this end, the magnetic circuit unit 13 is formed of a material having great permeability such as a ferromagnetic body. Accordingly, the magnetic circuit unit 13 may form a closed magnetic circuit around the optical filter layer 11. Consequently, the magnetic field generated in the magnetic field applying unit 12 does not escape to the outside of the active optical filter 10, and accordingly, the magnetic field does not influence elements outside of the active optical filter 10. In particular, when the active optical filter 10 is used as a sub-pixel of a display device, the display device can be designed such that the operation of the sub-pixel does not influence the operation of another sub-pixel which is adjacent to the sub-pixel by using the magnetic circuit unit 13. However, according to another embodiment of the present invention, if the active optical filter 10 is used independently, the influence of the magnetic field generated in the magnetic circuit unit 13 on outside elements does not have to be considered, and the magnetic circuit unit 13 may be omitted accordingly.

Figure 5:
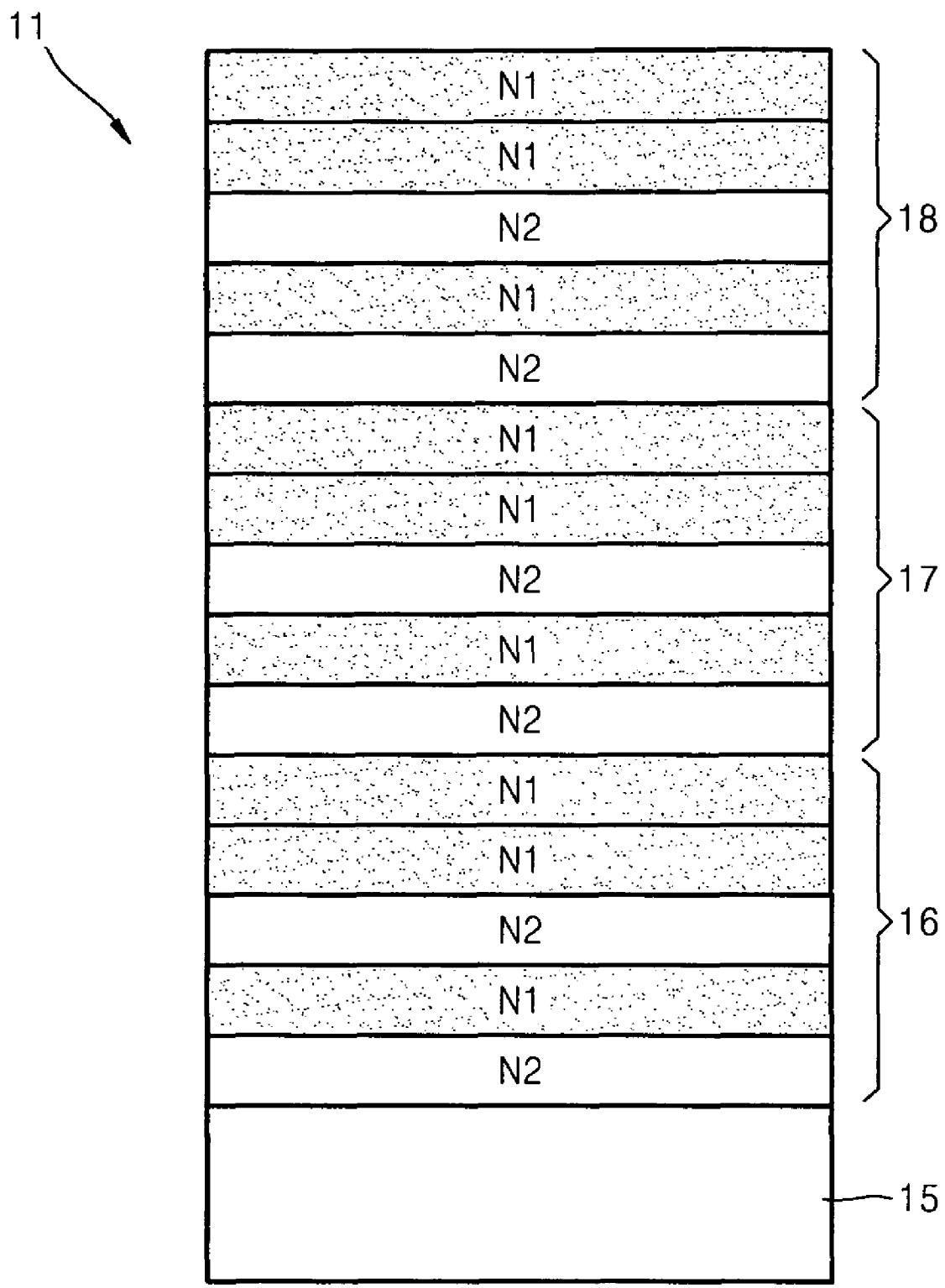
FIG. 5 is a schematic view of a multi-layer thin layer structure of an optical filter layer of the active optical filter illustrated in FIGS. 4A and 4B.

FIG. 5 is a schematic view of a multi-layer thin layer structure of an optical filter layer of the active optical filter illustrated in FIGS. 4A and 4B.

As illustrated in FIG. 5, according to an embodiment of the present invention, the optical filter layer 11 may be formed of a multi-layer thin layer structure in which a plurality of thin layers are sequentially and periodically stacked. In detail, the optical filter layer 11 may be formed of at least two layers of two kinds of layers N1 and N2 having different refractive indices sequentially and periodically stacked on a substrate 15. FIG. 5 illustrates unit cells 16, 17, and 18 which are stacked three times in the order of N2/N1/N2/N1/N1. The optical thickness of each of the thin layers N1 and N2 is ¼ of a central wavelength $\lambda$ in a wavelength band of light which is to be transmitted. Accordingly, the physical thickness d of each of the thin layers N1 and N2 can be expressed as Equation 2 below. In Equation 2, n denotes the refractive index of a corresponding layer.

$$d=\lambda/4n \qquad \text{Equation 2}$$

According to the current embodiment of the present invention, the refractive index of each of the thin layers N1 and N2 and the stacking order, stacking period and stacking frequency of the thin layers N1 and N2 can be selected according to desired optical characteristics of the optical filter layer 11, such as the wavelength band of light to be transmitted or reflected, and the transmittivity, the reflectivity and the absorption ratio of the optical filter layer 11 in the corresponding wavelength band. For example, considering the actual number part of the refractive index of each of the thin layers N1 and N2 according to the well-known ordinary theory of multi-layer thin layer technology, the thin layers N1 and N2 may be arranged such that only light having a predetermined wavelength band can pass through the optical filter layer 11 when a magnetic field having a sufficient intensity for the attenuation coefficient to be 0 is applied. The arrangement of the thin layers N1 and N2 can be determined easily according to the ordinary multi-layer thin layer technology, and thus description thereof will be omitted.

According to an embodiment of the present invention, the substrate 15 may be a typical transparent substrate such as glass, and the thin layers N1 and N2 may be formed of any material having a great variation of an attenuation coefficient k according to the variation of a magnetic field. For example, the thin layers N1 and N2 may be formed of any material, whether an inorganic material or an organic material, or whether a magnetic body or a non-magnetic body. In this configuration, when no magnetic field is applied to the optical filter layer 11, light is absorbed by the attenuation coefficient k of the thin layers N1 and N2, and thus light cannot transmit through the optical filter layer 11. When a magnetic field is applied to the optical filter layer 11, the attenuation coefficient k of the thin layers N1 and N2 becomes 0 along the direction of the applied magnetic field. Then, among the incident light parallel to the direction of the applied magnetic field, light having a predetermined wavelength band can transmit through the optical filter layer 11 according to the actual number part of the refractive index of the thin layers N1 and N2 and the arrangement of the thin layers N1 and N2.

Meanwhile, according to another embodiment of the present invention, the substrate 15 may be formed of a material, the attenuation coefficient k of which varies greatly according to the variation of a magnetic field, and the thin layers N1 and N2 may be formed of a typical transparent material having a very small attenuation coefficient k or 0. In this case, whether or not light is transmitted is determined according to whether a magnetic field is applied to the substrate 15, and the multi-layer thin layer structure, in which two kinds of thin layers N1 and N2 having different refractive indices are arranged, functions just as a conventional filter which transmits or reflects (or absorbs) only light having a predetermined wavelength band.

According to the current embodiment of the present invention, in order to operate the optical filter layer 11 using a magnetic field having a relatively small intensity, the substrate 15 may be formed of a material having a relatively high permeability. For example, a ferromagnetic body has high permeability. However, in the case of a ferromagnetic body, due to the hysteresis characteristics, the magnetization remains even after the magnetic field is removed. Accordingly, when the substrate 15 is formed of a ferromagnetic body, the hysteresis characteristics thereof should be removed in order to make the substrate 15 formed of the ferromagnetic body react linearly to the magnetic field. To this end, the ferromagnetic body may be formed of nano-crystals having a diameter of several nanometers. When the particles of a ferromagnetic body have a diameter of several nanometers, since they are very small crystals, the ferromagnetic body has linear characteristics like these of a paramagnetic body. This is called a superparamagnetic effect. The superparamagnetic effect may be disadvantageous in the case of a magnetic recording medium, making the increase of information storage density difficult. However, in the current embodiment of the present invention, the superparamagnetic effect is advantageous. According to the current embodiment of the present invention, the diameter of the ferromagnetic nano-crystals used as a material of the substrate 15 is about several nanometers, and may vary according to the type of the ferromagnetic material. The diameter of the ferromagnetic nano-crystals may be such that one ferro-magnetic nano-crystal can form a single magnetic domain.

Thus, the substrate 15 formed of ferromagnetic nano-crystals has been described. In addition, in order to maximize the effect of a magnetic field, the thin layers N1 and N2 may also be formed of ferromagnetic nano-crystals.

Figure 6:
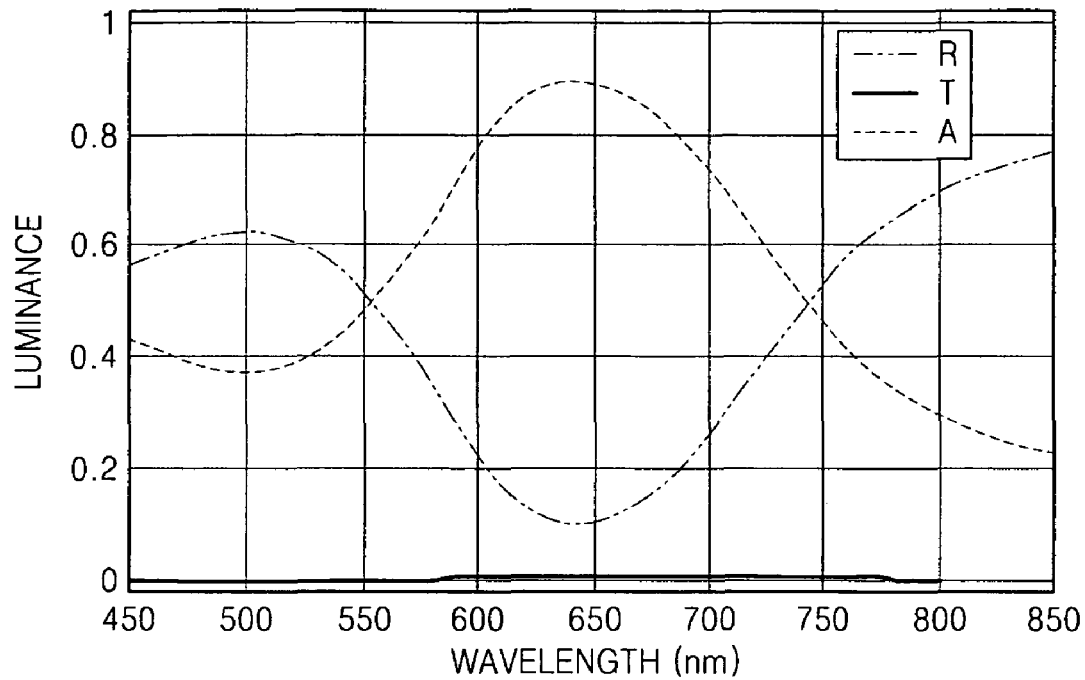
FIG. 6 illustrates simulation results of the operation of the optical filter layer of the active optical filter of FIG. 5 when a magnetic field is not applied thereto.

FIG. 6 illustrates simulation results of the operation of the optical filter layer of the active optical filter of FIG. 5 when a magnetic field is not applied thereto. In this regard, the optical filter layer 11 is assumed to be a structure in which unit cells 16, 17, and 18 formed in the order of N2/N1/N2/N1/N1 are stacked three times. Also, it is assumed that the complex refractive indices of the first and second thin layers N1 and N2, respectively, are N1=5.0+0.3j and N2=2.35+0.3j, respectively, when no magnetic field is applied, and the complex refractive indices of the first and second thin layers N1 and N2 are N1=5.0 and N2=2.35, respectively, when a magnetic field is applied. Also, the optical thickness of the first and second thin layers N1 and N2, respectively, is assumed to be 650 nm/4=162.5 nm. The physical thickness of the first and second thin layers N1 and N2, respectively, can be obtained by dividing 162.5 nm by 5.0 and 2.35, respectively, which are the actual number part of the refractive index of each layer.

In the graph of FIG. 6 showing the simulation results, T denotes transmittivity, R denotes reflectivity, and A denotes absorption ratio. Referring to the graph of FIG. 6, when no magnetic field is applied to the optical filter layer 11, the transmittivity in all wavelength bands is almost 0. That is, incident light in all wavelength bands does not transmit through the optical filter layer 11. Also, the reflectivity is very small at a wavelength of about 650 nm, and most of the light is absorbed. At a wavelength of about 450 nm, the reflectivity and the absorption ratio are similar to each other, and at a wavelength of about 850 nm, the reflectivity is increased and the absorption ratio is decreased.

On the other hand, FIGS. 7 thru 10 show simulation results of the operation of the optical filter layer of the active optical filter of FIG. 5 when a magnetic field is applied thereto.

Figure 7:
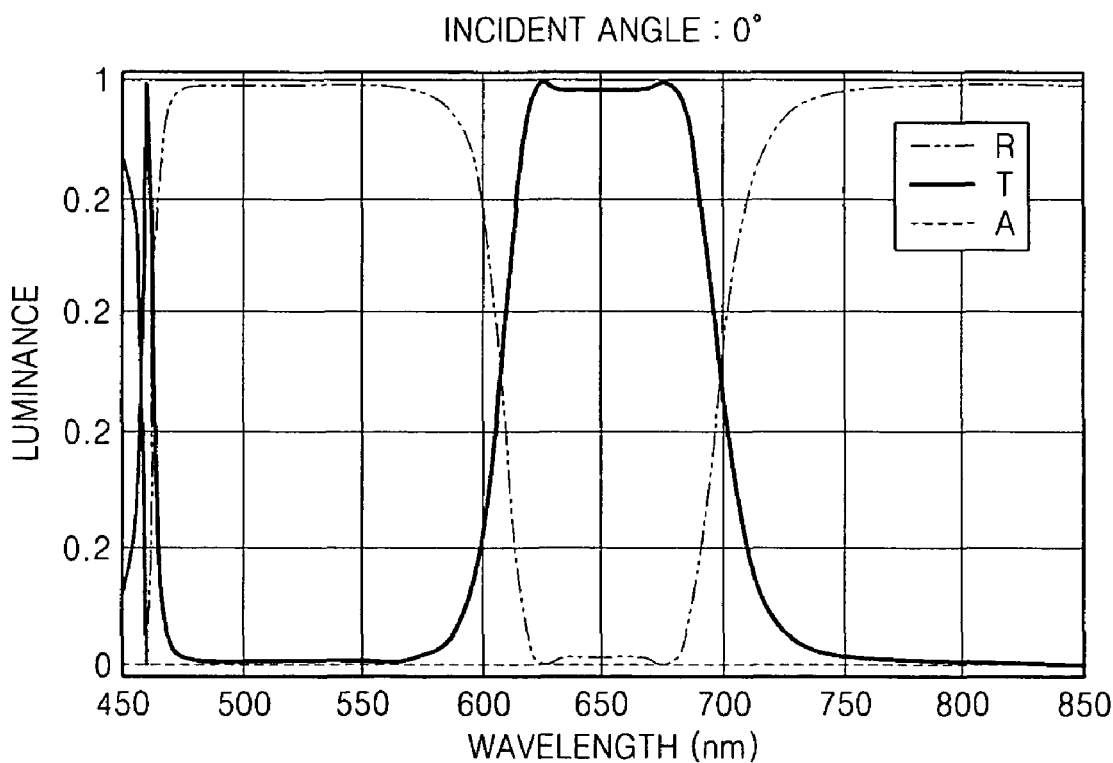
FIGS. 7 thru 10 illustrate simulation results of the operation of the optical filter layer of the active optical filter of FIG. 5 when a magnetic field is applied thereto.
Figure 8:
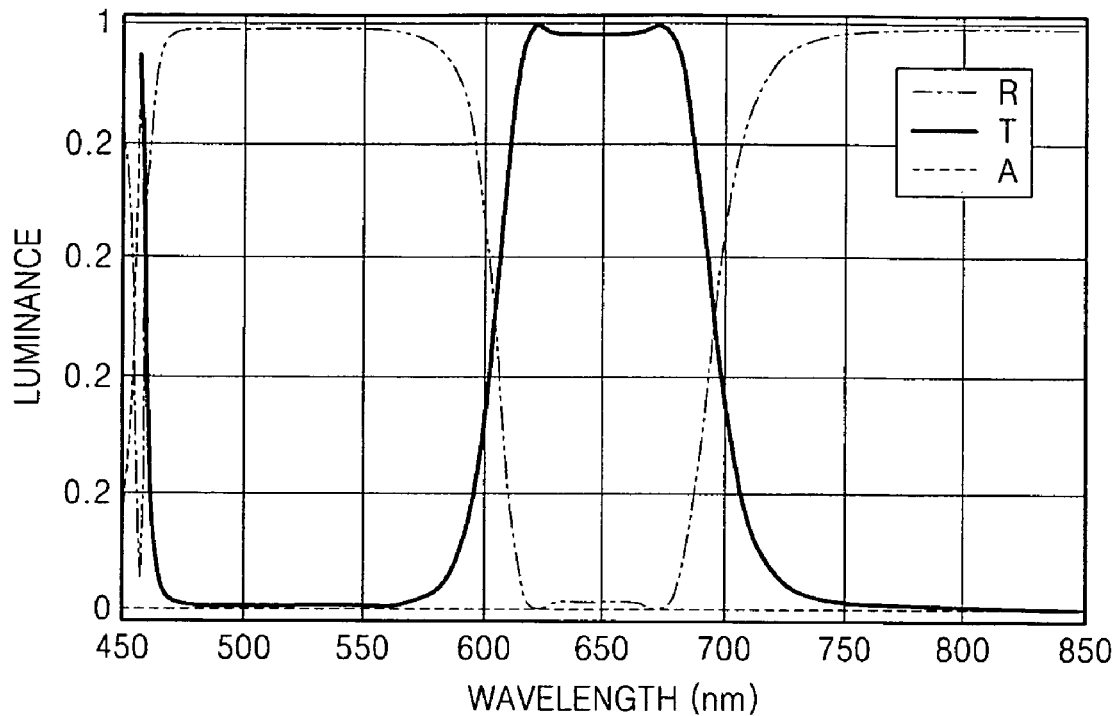
Figure 9:
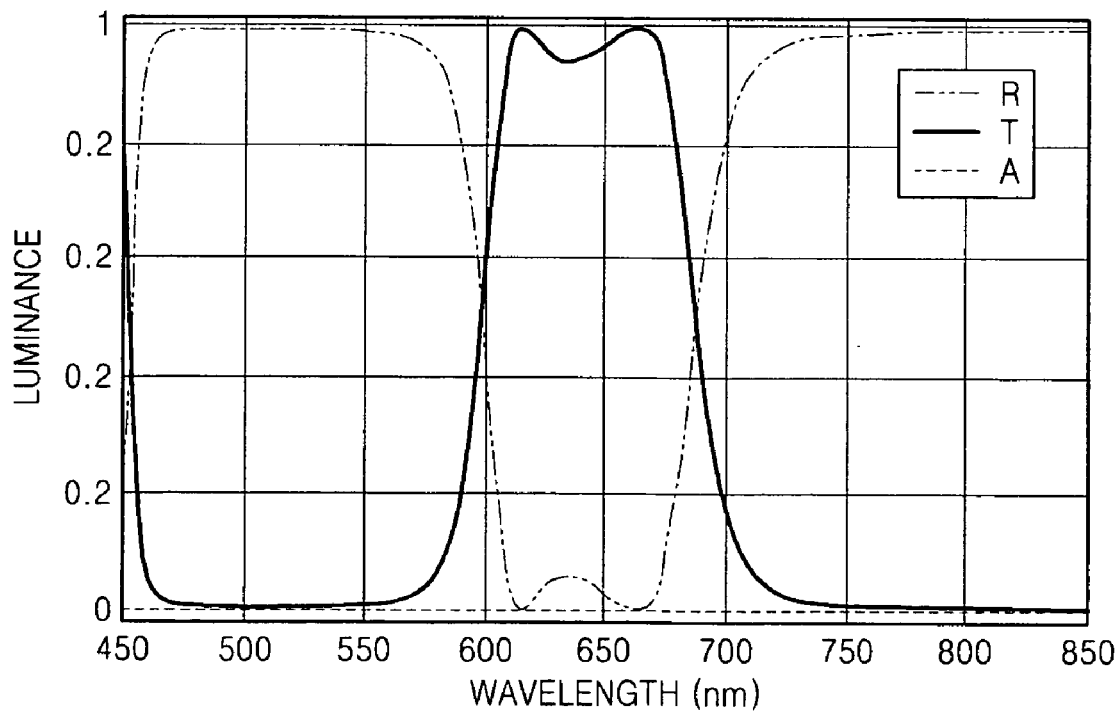
Figure 10:
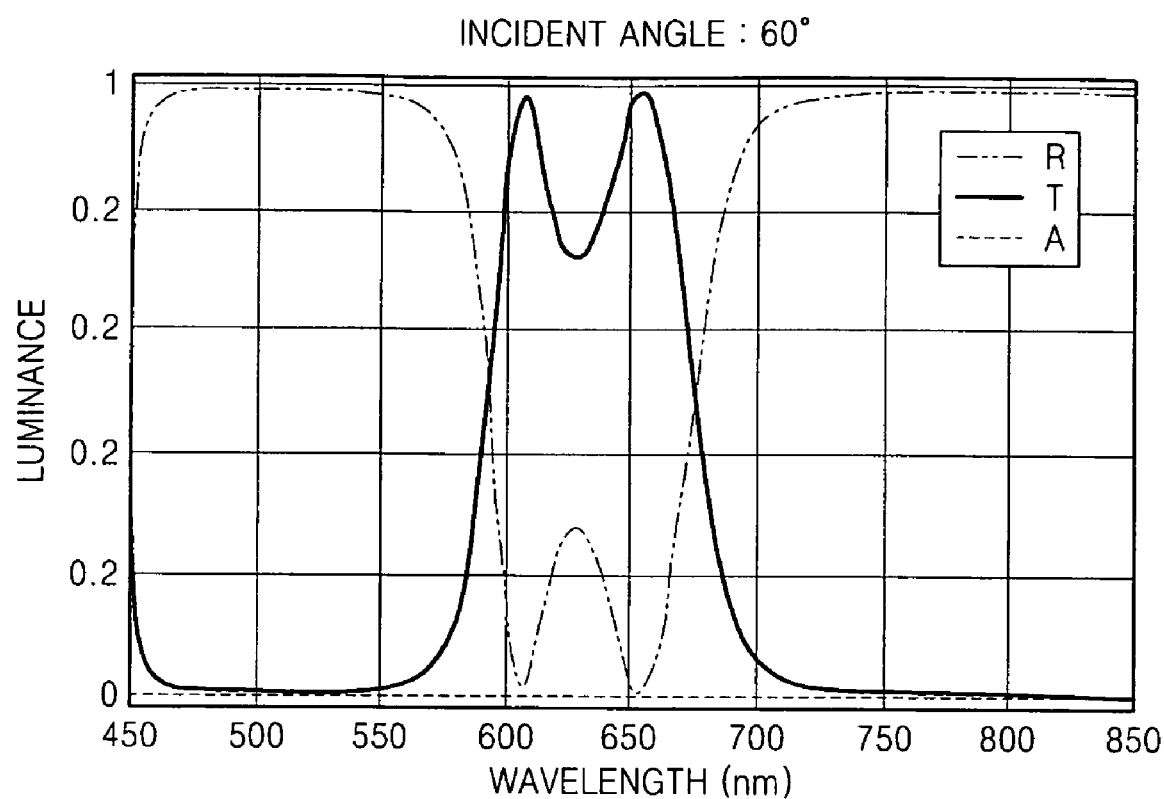

In this regard, the configuration of the optical filter layer 11 and the refractive index of the thin layers N1 and N2 are similar to those of FIG. 6. In FIGS. 7 thru 10, the incident angle of incident light is varied in order to find out the variation in the optical characteristics of the optical filter layer 11 according to the viewing angle variation. That is, the incident angle of FIG. 7 is 0°, the incident angle of FIG. 8 is 20°, the incident angle of FIG. 9 is 40°, and the incident angle of FIG. 10 is 60°.

As illustrated in the graphs of FIGS. 7 thru 10, when an attenuation coefficient k of the thin layers N1 and N2 is 0 as a magnetic field having sufficient intensity is applied to the optical filter layer 11, most of the incident light passes through the optical filter layer 11 in a short wavelength band between about 620 nm through 680 nm, and the reflectivity of the incident light is almost 0. Also, most of the incident light is reflected in the other wavelength bands. Also, the absorption ratio in all wavelength bands is almost 0. Moreover, as can be seen by comparing the graphs of FIGS. 7 thru 10, the variation of the transmittivity, reflectivity and absorption ratio of the optical filter layer 11 with the incident angle is very small.

According to the current embodiment of the present invention, the structure of the thin layers N1 and N2 in the optical filter layer 11 may be properly selected so as to transmit only light having a desired wavelength. That is, while a magnetic field is applied, the optical filter layer 11 may be formed so as to transmit only light having a red wavelength, or only light having a green wavelength, or only light having a blue wavelength. Accordingly, the active optical filter 10 can be used as red, green and blue sub-pixels of a color display device.

Figure 11:
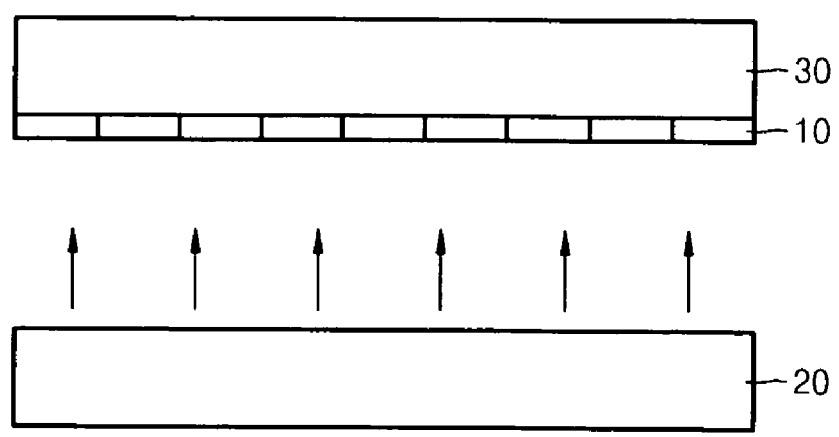
FIG. 11 is a schematic view of a display device including the active optical filter illustrated in FIGS. 4A and 4B.

FIG. 11 is a schematic view of a color display device including the active optical filter illustrated in FIGS. 4A and 4B. Referring to FIG. 11, the color display device may include a backlight unit 20, a transparent substrate 30 facing the backlight unit 20, and a plurality of sub-pixels formed of the active optical filter 10 and formed on a surface of the transparent substrate 30. In this configuration, the color display device may form an image by individually driving each of the active optical filters 10. As illustrated in FIG. 11, a color display device using the active optical filter 10 according to the current embodiment of the present invent may have a very simple structure, compared to the conventional color display device.

In the above-described embodiments, the direction of the applied magnetic field is parallel to the proceeding direction of light incident on the optical filter layer 11. When the proceeding direction of incident light is parallel to the direction of the applied magnetic field, the direction of all polarization components of incident light becomes perpendicular to the direction of the magnetic field. Accordingly, light which has passed through the optical filter layer 11 has no change in polarization. However, when the direction of the magnetic field is perpendicular to the proceeding direction of incident light, polarization components parallel to the direction of the magnetic field and polarization components perpendicular to the direction of the magnetic field are respectively present. In this case, light which has passed through the optical filter layer 11 may be light having only one kind of polarization components. Accordingly, when the transmitted light is changed into polarized light having predetermined polarization components, a magnetic field perpendicular to the incident light may be applied to the optical filter layer 11. In FIGS. 4A and 4B, the magnetic field applying unit 12 is disposed so as to surround the lateral circumference of the optical filter layer 11. However, the magnetic field applying unit 12 may be formed so as to surround at least one of a light incident surface and a light exit surface of the optical filter layer 11 instead. Thus, a magnetic field perpendicular to the direction of incident light can be applied to the optical filter layer 11.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. An active optical filter, comprising:
an optical filter layer for selectively transmitting and blocking light according to whether or not a magnetic field is applied; and
a magnetic field applying unit surrounding the optical filter layer for applying a magnetic field to the optical filter layer;
wherein the optical filter layer has a multi-layer thin layer structure which is formed of two kinds of thin layers having different respective refractive indices, and wherein the thin layers are sequentially and periodically stacked on a substrate.

2. The active optical filter of claim 1, wherein the magnetic field applying unit is one of a coil and a conductor film surrounding a lateral circumference of the optical filter layer.

3. The active optical filter of claim 2, wherein a direction of a magnetic field applied to the optical filter layer by the magnetic field applying unit is parallel to a proceeding direction of light incident on the optical filter layer.

4. The active optical filter of claim 1, wherein the two kinds of thin layers have different complex refractive indices relative to each other, and an attenuation coefficient k of an imaginary number part of the complex refractive index of the thin layers becomes 0 when a magnetic field is applied.

5. The active optical filter of claim 4, wherein the substrate is a transparent substrate.

6. The active optical filter of claim 4, wherein the thin layers are formed of ferromagnetic nano-crystals.

7. The active optical filter of claim 6, wherein one ferromagnetic nano-crystal forms a single magnetic domain.

8. The active optical filter of claim 1, wherein the substrate is formed of ferromagnetic nano-crystals.

9. The active optical filter of claim 8, wherein one ferromagnetic nano-crystal forms a single magnetic domain.

10. The active optical filter of claim 1, wherein the magnetic field applying unit surrounds at least one of a light incident surface and a light exit surface of the optical filter layer.

11. The active optical filter of claim 10, wherein a direction of a magnetic field applied to the optical filter layer by the magnetic field applying unit is perpendicular to a proceeding direction of light incident on the optical filter layer.

12. The active optical filter of claim 1, wherein an optical thickness of each of the thin layers is ¼ of a central wavelength of a wavelength band of light to be transmitted.

13. The active optical filter of claim 1, further comprising a magnetic circuit unit surrounding a lateral circumference of the magnetic field applying unit and formed of a ferromagnetic body.

14. A display device, comprising:
a backlight unit;
a transparent substrate facing the backlight unit; and
a plurality of sub-pixels formed on a surface of the transparent substrate,
wherein each of the sub-pixels comprises:
an optical filter layer for selectively transmitting and blocking light according to whether or not a magnetic field is applied to the optical filter layer; and
a magnetic field applying unit surrounding the optical filter layer for applying a magnetic field to the optical filter layer;
wherein the optical filter layer has a multi-layer thin layer structure which is formed of two kinds of thin layers having different respective refractive indices; and
wherein the thin layers are sequentially and periodically stacked on the transparent substrate.

15. The display device of claim 14, wherein each of the sub-pixels further comprises a magnetic circuit unit formed of a ferromagnetic body surrounding a lateral circumference of the magnetic field applying unit.

16. The display device of claim 14, wherein the magnetic field applying unit is one of a coil and a conductor film surrounding a lateral circumference of the optical filter layer.

17. The display device of claim 16, wherein a direction of a magnetic field applied to the optical filter layer by the magnetic field applying unit is parallel to a proceeding direction of light incident on the optical filter layer.

18. The display device of claim 14, wherein the two kinds of thin layers have different complex refractive indices relative to each other, and an attenuation coefficient k of an imaginary number part of the complex refractive index of the thin layers becomes 0 when a magnetic field is applied.

19. The display device of claim 14, wherein the magnetic field applying unit surrounds at least one of a light incident surface and a light exit surface of the optical filter layer.

20. The display device of claim 19, wherein a direction of a magnetic field applied to the optical filter layer by the magnetic field applying unit is perpendicular to a proceeding direction of light incident on the optical filter layer.

21. The display device of claim 14, further comprising a magnetic circuit unit surrounding a lateral circumference of the magnetic field applying unit and formed of a ferromagnetic body.

* * * * *